United States Patent [19]

Watt

[11] Patent Number: 5,579,526
[45] Date of Patent: Nov. 26, 1996

[54] SYNCHRONOUS/ASYNCHRONOUS FEEDBACK SYSTEM HAVING LOGIC CIRCUIT FOR CHANGING THE STATE OF THE PROCESSING CORE IN RESPONSE TO OUTPUT OF SYNCHRONOUS STATE MACHINE AND ASYNCHRONOUS LATE INPUTS

[75] Inventor: Simon C. Watt, Cambridge, United Kingdom

[73] Assignee: Advanced Risc Machines Limited, Cambridge, United Kingdom

[21] Appl. No.: 322,318

[22] Filed: Oct. 13, 1994

[30] Foreign Application Priority Data

May 17, 1994 [GB] United Kingdom .................. 9409946

[51] Int. Cl.$^6$ .............................. G06F 13/00; G06F 13/42
[52] U.S. Cl. ........................ 395/800; 395/878; 395/595; 364/239; 364/239.1
[58] Field of Search ..................................... 395/800, 325, 395/725, 290, 375, 726, 731, 500, 878; 364/977.5, DIG. 1, DIG. 2

[56] References Cited

U.S. PATENT DOCUMENTS 4,562,427  12/1985  Ecron ................................. 340/825.5
5,226,170  7/1993  Rubinfeld .
5,255,375  10/1993  Crook et al. .......................... 395/325
5,341,495  8/1994  Joyce et al. .......................... 395/500
5,418,930  5/1995  Swarts .................................. 395/500
5,469,547  11/1995  Pawlowski ............................ 395/285

FOREIGN PATENT DOCUMENTS 2234613  2/1991  United Kingdom ............. G06F 9/46

*Primary Examiner*—Meng-Ai T. An
*Attorney, Agent, or Firm*—Albert C. Smith; John T. McNelis

[57]  ABSTRACT

Data processing apparatus for executing successive data processing instructions comprises a processing core having a current operational state selected from a predetermined set of possible operational states, the current operational state being defined by a control state signal supplied to the core; a synchronous state machine circuit for generating an output state signal, indicating a provisionally valid next operational state of the core, in response to a predetermined phase of a current clock cycle of a clocking signal, the output state signal being dependent upon a current operational state of the core and control signals generated by the core before the predetermined phase of the current clock cycle indicative of a next data processing instruction to be executed by the core; and an asynchronous logic circuit for generating the control state signal in response to the output state signal and late control signals received after the predetermined phase of the current clock cycle.

7 Claims, 4 Drawing Sheets

SYNCHRONOUS/ASYNCHRONOUS FEEDBACK SYSTEM HAVING LOGIC CIRCUIT FOR CHANGING THE STATE OF THE PROCESSING CORE IN RESPONSE TO OUTPUT OF SYNCHRONOUS STATE MACHINE AND ASYNCHRONOUS LATE INPUTS

BACKGROUND OF THE INVENTION

1. Field of the Invention

This invention relates to data processing.

2. Description of the Prior Art

Some electronic data processing devices employ a processing core which can operate in accordance with a number of possible operating modes or states. In a simple example, the processing core may operate in either an "internal operation" mode or a "memory access" mode, depending on the particular processing task which has to be performed at any time.

It has been proposed to use a synchronous state machine to control the transition between the various operating states of such a processing core. Synchronous state machines are logic circuits which generally comprise both combinational logic and clocked registers, with a degree of feedback so that signals generated in response to a clocking pulse are passed back as inputs to a part of the circuit for use at the next clocking pulse. These circuits have a number of permitted output "states", represented by the logic levels of one or more output signals, and various permitted transitions between the output states. Because of the use of feedback, the circuit will move in a permitted transition from one state to another in response to particular sets of input signals. The transitions between states all take place in response to the clocking signal; for this reason such circuits are referred to as synchronous state machines.

In the simple example described above, a state machine may control synchronous transitions between the two possible operating states of the processing core. This can be achieved by supplying various inputs to the state machine representing the current and next tasks to be performed by the core and other current operating features of the data processing device. The output of the state machine is then connected as a control input to the processing core.

For example, when a memory access is required, the state machine would generate an output state controlling the core to assume the "memory access" mode. When the required memory address has been accessed, the state machine's output might revert back to an output controlling the core to assume the "internal operation" mode.

SUMMARY OF THE INVENTION

It is an object of the invention to improve the control of the operational state of a processing core in a data processing apparatus.

This invention provides a data processing apparatus for executing successive data processing instructions, the apparatus comprising:

a processing core having a current operational state selected from a predetermined set of possible operational states, the current operational state being defined by a control state signal supplied to the core;

a synchronous state machine circuit for generating an output state signal, indicating a provisionally valid next operational state of the core, in response to a predetermined phase of a current clock cycle of a clocking signal, the output state signal being dependent upon a current operational state of the core and control signals generated by the core before the predetermined phase of the current clock cycle indicative of a next data processing instruction to be executed by the core; and an asynchronous logic circuit for generating the control state signal in response to the output state signal and late control signals received after the predetermined phase of the current clock cycle.

This invention recognises that while synchronous state machines can be useful in controlling the operation of a data processing core, the very fact that such circuits are synchronous in operation (requiring all of their inputs to be set before a clocking signal is received) can restrict their usefulness in some circumstances.

For example, the next operational state of the processing core should depend on whether the current instruction has been successfully executed. However, if the state machine has to be delayed to wait for a signal acknowledging that the current instruction has been successfully executed (which signal may be generated late in the current processing cycle), the overall data processing performance can suffer.

The invention addresses this problem by using the state machine to generate a provisionally valid next operational state of the processing core, but then allowing that state to be altered (if necessary) asynchronously by an asynchronous logic circuit. This allows factors such as the successful execution of a current instruction, the success of a buffered memory access or the successful acquisition of control of an interconnection bus to influence the next operational state of the core.

In one preferred embodiment, a detection is made of whether the core has been granted control of an interconnection bus. If not, then again processing may have to be temporarily stalled. Accordingly, it is preferred that the apparatus comprises an interconnection bus to allow data transfer between the core and the data memory, the core comprising means 240 for requesting control of the interconnection bus to perform a data transfer; and means for generating a late control signal indicating whether control of the interconnection bus has been granted to the core.

In another preferred embodiment, a detection may be made of whether a current memory access can be buffered. If the memory access cannot be buffered, the data processing operation of the core may have to be stalled until the memory access can be performed directly. It is thus preferred that the apparatus comprises a data memory; and a data buffer for buffering data transfers between the core and at least a subset of the data memory; memory management means for detecting whether a current data transfer can be buffered in the data buffer and for generating a late control signal indicating whether the current data transfer can be buffered in the data memory.

Preferably the predetermined set of operational states comprises:

a first operational state in which the core is operable to perform data processing operations internal to the core;

a second operational state in which the core is operable to initiate buffered data transfers between the core and the data memory via the data buffer; and a third operational state in which the core is operable to initiate unbuffered data transfers between the core and the data memory not via the data buffer.

Preferably the predetermined phase is a clocking edge of the clocking signal. In this case it is preferred that the clocking edge is a rising edge of the clocking signal.

Viewed from a second aspect this invention provides a method of operation of data processing apparatus in which successive data processing instructions are executed, the apparatus comprising a processing core having a current operational state selected from a predetermined set of possible operational states, the current operational state being defined by a control state signal supplied to the core; the method comprising the steps of:

generating an output state signal, indicating a provisionally valid next operational state of the core, in response to a predetermined phase of a current clock cycle of a clocking signal, the output state signal being dependent upon a current operational state of the core and control signals generated by the core before the predetermined phase of the current clock cycle indicative of a next data processing instruction to be executed by the core; and generating the control state signal in response to the output state signal and late control signals received after the predetermined phase of the current clock cycle.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
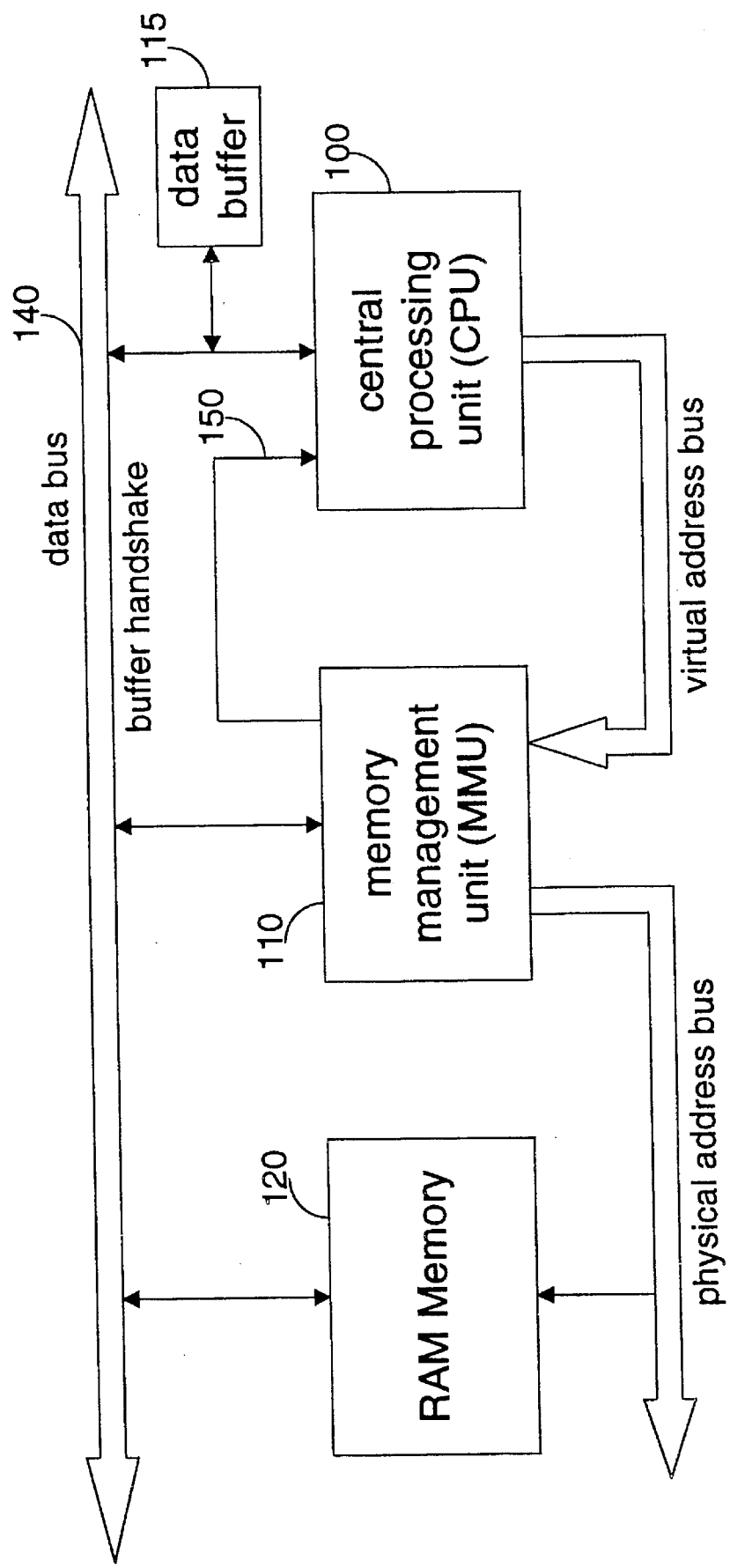
FIG. 1 is a schematic block diagram of a data processing apparatus.

FIG. 1 is a schematic block diagram of a data processing apparatus. The apparatus comprises a central processing unit (CPU) 100, a memory management unit (MMU) 110 and a random access memory (RAM) 120. The CPU 100 and the MMU 110 are linked by a virtual address bus for transmitting memory addresses from the CPU 100 to the MMU 110, and the MMU 110 and the RAM 120 are linked by a physical address bus. A data bus 140 links the CPU 100, the MMU 110 and the RAM 120 for the exchange of data. The CPU and the MMU are connected by hand-shaking control lines 150 to allow control information to be passed between the MMU and the CPU during memory accesses.

Figure 2:
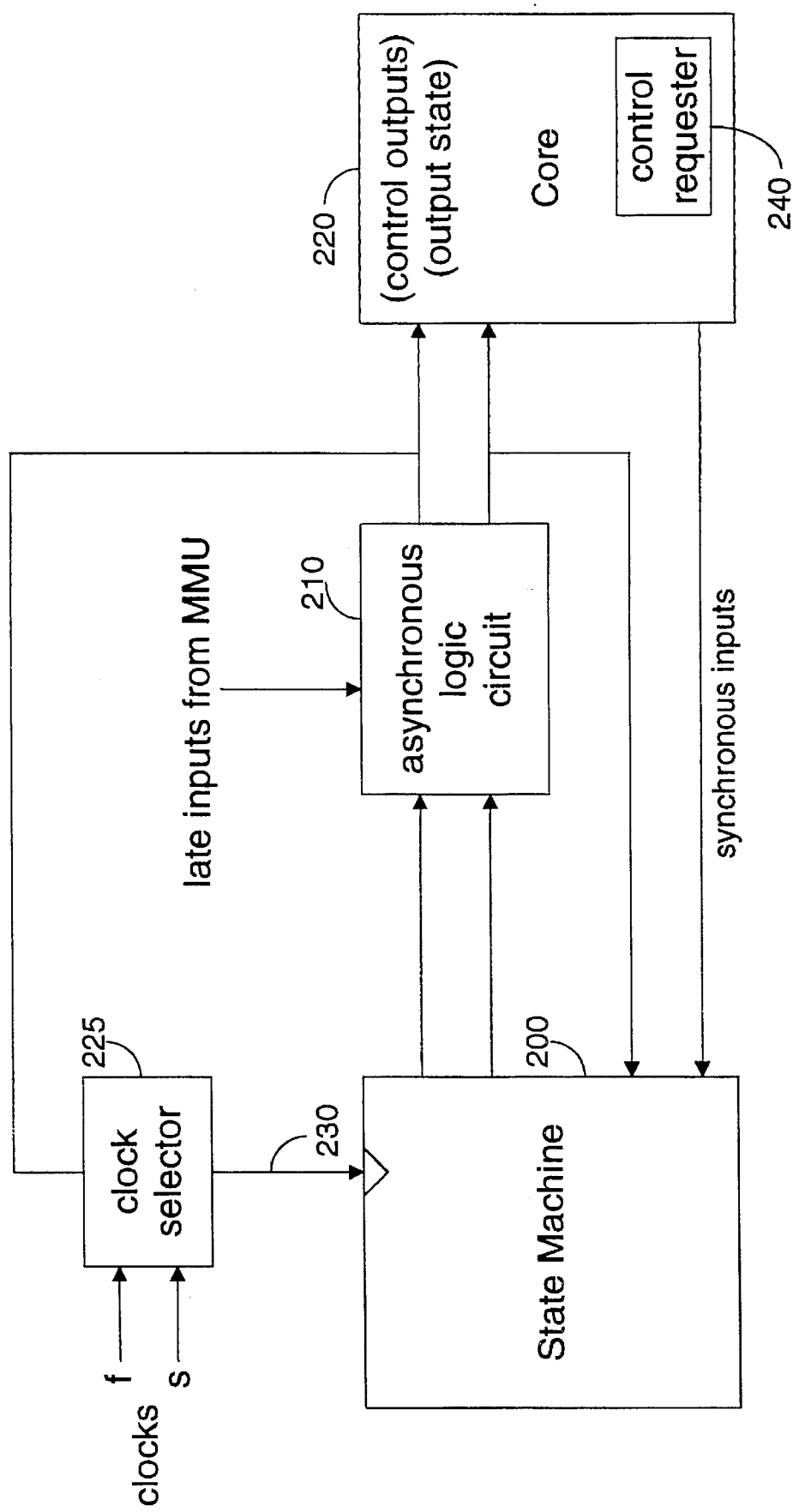
FIG. 2 is a schematic diagram of a central processing unit.

FIG. 2 is a schematic diagram of the central processing unit 100. The CPU 100 comprises a synchronous state machine 200 embodied as a programmable logic array (PLA), an asynchronous logic circuit 210 and a processing core 220. The processing core 220 performs primarily arithmetical operations to be carried out by the CPU 100.

The synchronous state machine 200 maintains overall control of the CPU 100 operation. In particular, the synchronous state machine 200 controls data transfer between a cache memory, the memory management unit 110 and the core, and controls the clocking of the core 220. This control over the cope clocking is important because the core clock speed may then be varied between successive clocking cycles depending on the nature of the current operation being performed by the core 220.

In particular, the state machine (via the asynchronous logic circuit) controls a clock selector 225. The clock selector receives a fast ("f") and a slow ("s") clock signal, and selects either the fast or slow clock signal to be supplied to the state machine 200. The fast clock signal is used to control fast, sequential memory accesses (see below) and the slow clock signal is used to control slow, external memory accesses (again, see below).

Accordingly, the synchronous state machine 200 operates under the control of a clock signal 230 supplied by the clock selector 225. The state machine 200 operates in a conventional manner, in that its inputs need to be set before a single active edge of the clock signal 230 and its outputs are generated a short processing delay after the active edge of the clocking signal 230.

In the present embodiment, the state machine 200 receives synchronous inputs from the core 220 and from the output of the asynchronous logic circuit 210. The state machine 200 generates synchronous outputs which are supplied to the asynchronous logic circuit 210. The asynchronous logic circuit 210 is then able to modify the synchronous outputs before passing the potentially modified outputs to the core 220. The modification carried out by the asynchronous logic circuit 210 is carried out on the basis of so-called "late" inputs which the asynchronous logic circuits receives from, for example, the MMU 110.

Figure 3:
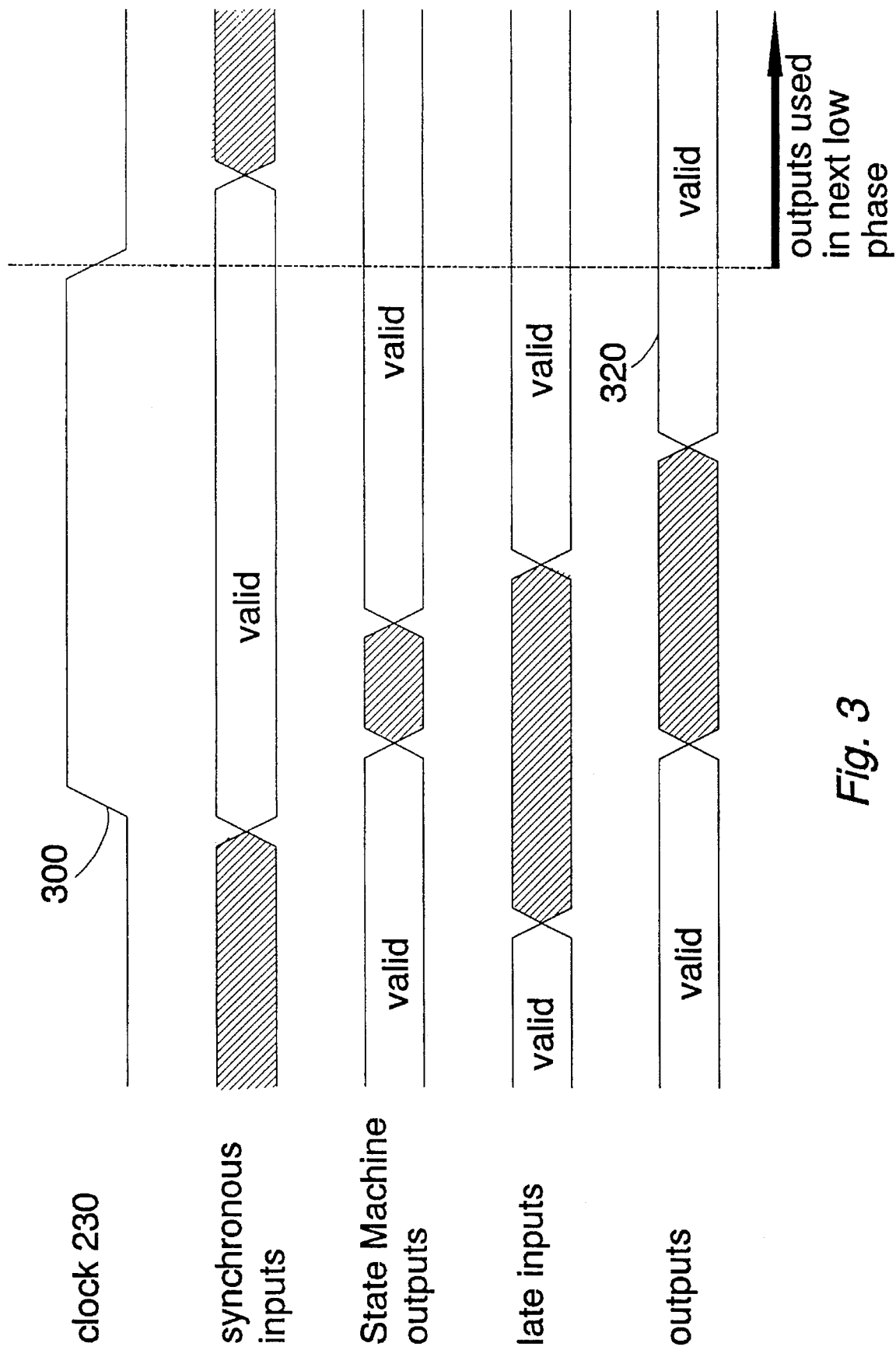
FIG. 3 is a schematic timing diagram illustrating the operation of the central processing unit of FIG. 2.

FIG. 3 is a schematic timing diagram illustrating the operation of the synchronous state machine 200 and the asynchronous logic circuit 210.

The top line of FIG. 3 illustrates the clock signal 230. The active edge at which the synchronous state machine 200 changes state is a rising clock edge 300. It is therefore required that the synchronous inputs to the state machine 200 become valid by the clock edge 300. This is illustrated in the second line of FIG. 3.

The state machine 200 generates a valid output state a short processing delay after the clock edge 300. This is illustrated as a valid state 310 in the third line of FIG. 3.

The late inputs supplied to the asynchronous logic circuit 210 can become valid after the clock edge 300, in contrast with the synchronous inputs to the state machine 200 which must be valid by the clock edge 300. In response to these late inputs (shown on the fourth line of FIG. 3), the asynchronous logic circuit 210 generates output signals 320 (shown in the fifth line of FIG. 3). The output signals 320 are, at least in part, fed back to the state machine to become synchronous inputs to the state machine 200 before the next rising clock edge.

An example of the operation of the asynchronous logic circuit 210 to modify the output state of the state machine 200 occurs during a failed unbuffered write operation.

The state machine 200 is arranged to assume that all write operations from the CPU 100 will be buffered. A buffered write operation is one in which the CPU writes data into a write buffer 115 and then carries on execution while the data is transferred from the write buffer to the destination address. However, whether a buffered write can be carried out for a particular memory address is a function of that address. The MMU 110 maintains look-up tables which have to be consulted to determine whether a buffered write is possible to a current write address. The MMU 110 returns a hand-shake signal to the CPU 100 indicating whether a buffered write operation is possible for a current address. However, the state of the hand-shake signal cannot be guaranteed by the clock edge 300 at which the state machine's state changes, without limiting the maximum operating frequency of the CPU 100.

Accordingly, if the MMU returns a hand-shake signal to the CPU 100 indicating that a current write operation cannot be buffered, the hand-shake signal is supplied as a late input to the asynchponous logic circuit 210. In this case, the output state generated by the state machine 200 assumes that a buffered write can take place, but this output state is modified by the asynchponous logic circuit 210, so that the output state supplied from the asynchponous logic circuit 210 to the core 220 is one indicating that a buffered write cannot take place. When a buffered write is not possible, the CPU has to assume a mode of operation perferred to as "slow ext", in which memory accesses are made direct to external memory (a slow process) rather than via a buffer.

The assumptions made by the synchronous state machine 200 may be selected so that they will generally be true, and will only occasionally require modification be the asynchponous logic circuit 210.

Figure 4:
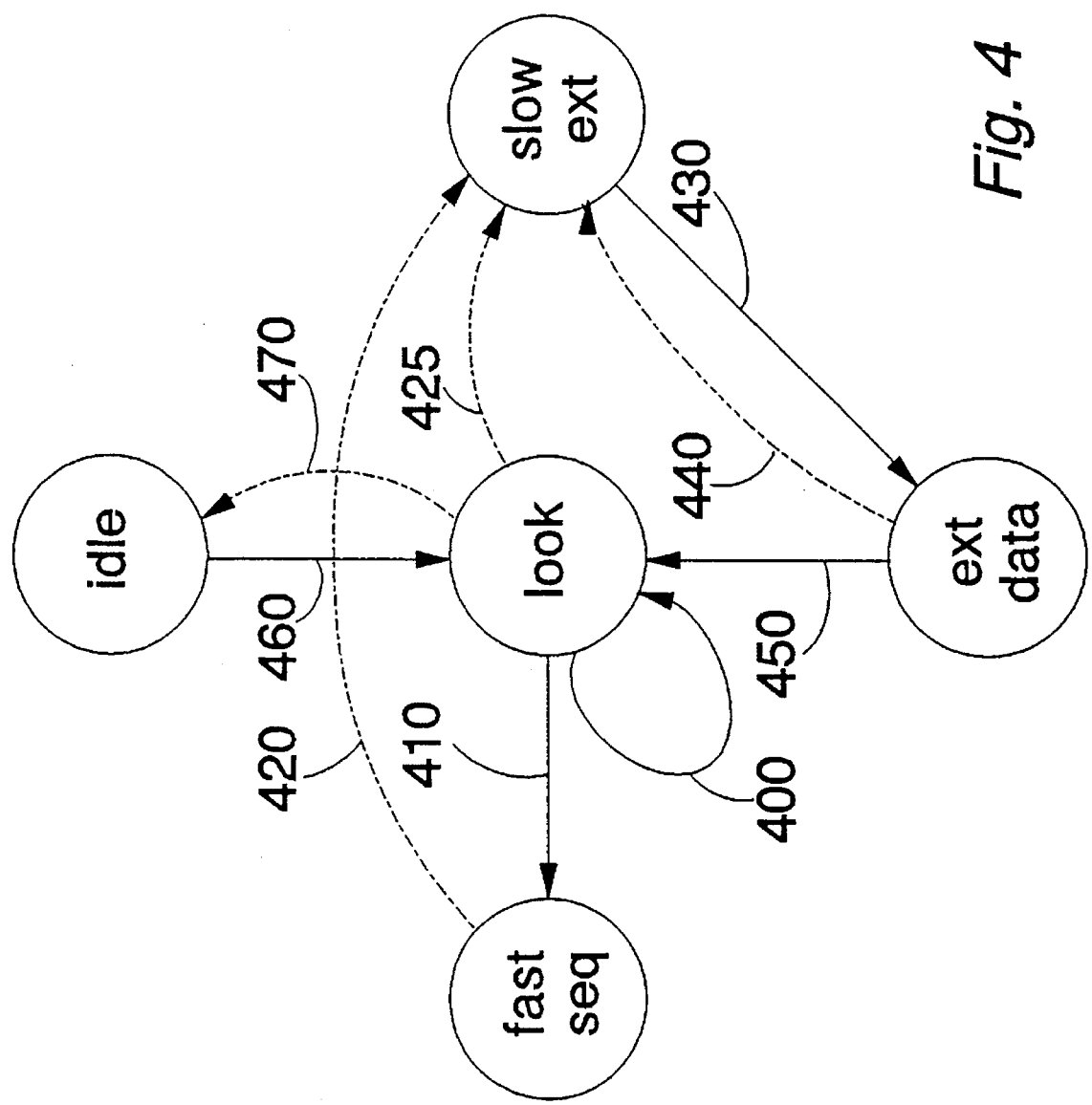
FIG. 4 is a schematic state diagram illustrating possible operating states of a processing core.

FIG. 4 is a schematic state diagram illustrating the possible states of the state machine 200 and possible modifications of those states by the asynchponous logic 210.

The five possible states of the state machine 200 (and of the output of the asynchronous logic circuit 210) are listed below. These represent possible operating states of modes of the core 220. The operating mode of the core 220 is set by the output of the asynchronous logic circuit 210, which itself is either equal to the output state of the state machine 200 of (if the late inputs indicate that the output state of the state machine 200 is now inappropriate) may be a different state selected from the following list.

In the "idle" state, the CPU is carrying out internal tasks (such as a multi-cycle arithmetic operation) and so is not attempting any accesses to memory of memory buffers.

In the "look" state, the CPU 100 has issued a new address for a memory access, and is examining a cache memory to detect whether that address is held in the cache.

The "slow ext" state refers to unbuffered memory accesses, when the CPU 100 accesses external memory directly by placing the appropriate address onto an address bus.

The "ext data" state is used during an external memory access and refers to the state when the CPU 100 is expecting data to be transferred to or from the CPU on the data bus.

Finally, the "fast seq" state refers to fast, sequential, memory accesses, i.e. accesses in which data are read from the cache memory or in which data are written sequentially via the write buffer.

In the example of a failed unbuffered write described above, the state machine 200 starts in the "look" state and will move either into the "fast seq" state to perform sequential buffered writes or will remain in the "look" state. If the MMU detects that the current memory location is found to be unbufferable then the asynchronous logic circuit 210 changes the state machine output from either the "look" or the "fast seq" state into the state "slow ext". This corrects the state of the core 100. In addition, the asynchronous logic circuits 210 alters the way in which the cache and the MMU are controlled. Since the modified state is fed back to the state machine 200, the next transition will occur from the modified state.

These transitions are illustrated on FIG. 4 by a solid line 400 indicating a possible synchronous transition from the "look" state back to the "look" state, and a solid line 410 indicating a possible synchronous transition from the "look" state to the "fast seq" state. The modification taken by the asynchronous logic circuit 210 from the "fast seq" state to the "slow ext" state is indicated by a broken line 420 and from the "look" state to the "slow ext" state by a broken line 425.

During external memory accesses, as described above, the state machine 200 performs a synchronous transition 430 from the "slow ext" state to the "ext data" state. However, if the circuitry controlling the external buses (which may itself be a state machine) does not respond by assuming the required state for bus communication by the next clock cycle, the asynchronous logic circuit 210 forces the operation state of the core back by an asynchronous transition 440 from "ext data" to "slow ext". However, if the external data access runs successfully, the state will return synchronously 450 to the "look" state.

A similar mechanism can also be used to force the state machine into the "idle" state (ie from the "look" state into the "idle" state). This need not necessarily be used because of a late change in input, but can reduce the number of inputs required to the main state machine, therefore saving cost in fabrication of the state machine. Accordingly, FIG. 4 illustrates a synchronous transition 460 from the "idle" state to the "look" state, and then a possible asynchronous transition 470 from the "look" state back to the "idle" state.

Although illustrative embodiments of the invention have been described in detail herein with reference to the accompanying drawings, it is to be understood that the invention is not limited to those precise embodiments, and that various changes and modifications can be effected therein by one skilled in the art without departing from the score and spirit of the invention as defined by the appended claims.

I claim:

1. Data processing apparatus for executing successive data processing instructions, said apparatus comprising:

a processing core having a current operational state, said current operational state being one of a predetermined set of possible operational states and selected in response to a control state signal supplied to said core;

a synchronous state machine circuit for generating an output state signal in response to a predetermined phase of a current clock cycle of a clocking signal, said output state signal indicating a provisionally valid next operational state of said core and is dependent upon said current operational state of said core and control signals generated by said core before said predetermined phase of said current clock cycle indicative of a next data processing instruction to be executed by said core; and an asynchronous logic circuit for generating said control state signal in response to said output state signal and a late control signal received by said asynchronous logic circuit after said predetermined phase of said current clock cycle, said control state signal being received by the core and being capable of causing the core to change said current operational state, and said control state signal being also received by the synchronous state machine at the next clock pulse to complete a feedback loop.

2. The apparatus according to claim 1, comprising:

an interconnection bus to allow data transfer between said core and a data memory, said core comprising means for requesting control of said interconnection bus, from a bus controller, to perform a data transfer; and means for generating said late control signal indicating whether said bus controller has granted control of said interconnection bus to said core.

3. The apparatus according to claim 1, comprising:

a data memory;

a data buffer, coupled to said data memory, for buffering data transfers between said core and at least a subset of said data memory; and memory management means, coupled to said asynchronous logic circuit, for detecting whether a current data transfer can be buffered in said data buffer and for generating said late control signal indicating whether said current data transfer can be buffered in said data memory.

4. The apparatus according to claim 3, in which said predetermined set of operational states comprises:

a first operational state in which said core is operable to perform data processing operations internal to said core;

a second operational state in which said core is operable to initiate buffered data transfers between said core and said data memory via said data buffer; and a third operational state in which said core is operable to initiate unbuffered data transfers between said core and said data memory not via said data buffer.

5. The apparatus according to claim 1, in which said predetermined phase is a clocking edge of said clocking signal.

6. The apparatus according to claim 5, in which said clocking edge is a rising edge of said clocking signal.

7. A method of operation of data processing apparatus in which successive data processing instructions are executed, said apparatus comprising a processing core having a current operational state, said current operational state being one of a predetermined set of possible operational states and selected in response to a control state signal supplied to said core, said method comprising the steps of:

generating an output state signal in response to a predetermined phase of a current clock cycle of a clocking signal, said output state signal indicating a provisionally valid next operational state of said core and is dependent upon a current operational state of said core and control signals generated by said core before said predetermined phase of said current clock cycle indicative of a next data processing instruction to be executed by said core; and generating said control state signal in response to said output state signal and late control signal received by said asynchronous logic circuit after said predetermined phase of said current clock cycle, said control state signal being received by the core and being capable of causing the core to change said current operational state, and said control state signal being also received by the synchronous state machine at the next clock pulse to complete a feedback loop.

* * * * *